(12) United States Patent
Massicotte

(10) Patent No.: US 12,715,755 B2
(45) Date of Patent: Aug. 25, 2026

(54) ENVIRONMENTALLY FRIENDLY METHOD OF SUPPLYING WINE AT A DISPENSING LOCATION, WINE DISPENSING SYSTEM AND CABINET

(71) Applicant: Louis Massicotte, Quebec (CA)

(72) Inventor: Louis Massicotte, Quebec (CA)

(73) Assignee: FIDUCIE DES BRAVES 2021, Bouvier (CA)

( * ) Notice: Subject to any disclaimer, the term of this patent is extended or adjusted under 35 U.S.C. 154(b) by 640 days.

(21) Appl. No.: 17/939,278

(22) Filed: Sep. 7, 2022

(65) Prior Publication Data

US 2023/0077064 A1 Mar. 9, 2023

Related U.S. Application Data

(60) Provisional application No. 63/241,355, filed on Sep. 7, 2021.

(51) Int. Cl.
*B67D 3/00* (2006.01)
*B67D 1/08* (2006.01)
(Continued)

(52) U.S. Cl.
CPC ......... *B67D 3/0061* (2013.01); *B67D 1/0888* (2013.01); *B67D 3/0003* (2013.01);
(Continued)

(58) Field of Classification Search
CPC .. B67D 3/0061; B67D 3/0009; B67D 3/0022; B67D 2210/00047; B67D 2210/00128;
(Continued)

(56) References Cited

U.S. PATENT DOCUMENTS 3,878,970 A * 4/1975 Nezworski ........... B67D 1/1247 222/61
4,308,975 A * 1/1982 Bowen ..................... B67D 1/04 222/640

(Continued)

FOREIGN PATENT DOCUMENTS

| | | |
|---|---|---|
| EP | 0191436 | 8/1986 |
| EP | 1642863 | 4/2006 |

OTHER PUBLICATIONS

Micro Matic, Wine on Tap Equipment—Wine Dispensing, https://www.micromatic.com/products/wine-on-tap. Consulted on Aug. 18, 2022.

(Continued)

*Primary Examiner* — Frederick C Nicolas
(74) *Attorney, Agent, or Firm* — Reno Lessard; Norton rose fulbright Canada LLP

(57) ABSTRACT

There is described a wine supply system. The wine supply system generally has a tank in a source building, the tank containing wine; a plurality of ducts extending between the tank and a corresponding plurality of dispensing buildings remote from the source building and from one another, at least some wine being forcingly guided from the tank to the dispensing buildings via the plurality of ducts; and a temperature maintaining device disposed along the plurality of ducts outside of the source building and the plurality of dispensing buildings, the temperature maintaining device configured for at least one of heating and cooling the ducts to maintain the wine within a given temperature range.

17 Claims, 5 Drawing Sheets

(51) Int. Cl.
*G06Q 10/08* (2024.01)
*G06Q 30/0283* (2023.01)
*G06Q 30/04* (2012.01)
*G06Q 30/0601* (2023.01)

(52) U.S. Cl.
CPC ......... *B67D 3/0009* (2013.01); *B67D 3/0022* (2013.01); *B67D 3/0038* (2013.01); *B67D 3/0077* (2013.01); *B67D 3/0083* (2013.01); *G06Q 10/08* (2013.01); *G06Q 30/0283* (2013.01); *G06Q 30/04* (2013.01); *G06Q 30/0609* (2013.01); *B67D 2210/00047* (2013.01); *B67D 2210/00099* (2013.01); *B67D 2210/00128* (2013.01); *B67D 2210/00149* (2013.01)

(58) Field of Classification Search
CPC ........ B67D 2210/00149; B67D 3/0003; B67D 2210/00099; B67D 3/0038; B67D 3/0077; B67D 3/0083; B67D 1/0888; G06Q 10/08; G06Q 30/0283; G06Q 30/04; G06Q 30/0609
See application file for complete search history.

(56) References Cited

U.S. PATENT DOCUMENTS

| | | | | | |
|---|---|---|---|---|---|
| 4,518,104 | A | | 5/1985 | Iannelli et al. | |
| 4,979,647 | A | | 12/1990 | Hassell | |
| 5,228,312 | A | * | 7/1993 | Williams | B67D 1/0862 62/390 |
| 6,047,866 | A | * | 4/2000 | Brown | B67D 3/0083 222/506 |
| 6,164,083 | A | | 12/2000 | Leeming et al. | |
| 6,312,608 | B1 | | 11/2001 | Buckner | |
| 6,913,167 | B2 | | 7/2005 | Phelps et al. | |
| 7,373,784 | B2 | * | 5/2008 | Haskayne | B67D 1/0862 222/146.6 |
| 7,552,593 | B2 | | 6/2009 | Smith | |
| 7,861,892 | B1 | * | 1/2011 | White | F25D 3/08 222/608 |
| 8,083,104 | B2 | | 12/2011 | Roetker et al. | |
| 8,584,897 | B2 | | 11/2013 | Belcham | |
| 8,701,437 | B2 | | 4/2014 | Choi | |
| 8,857,666 | B2 | | 10/2014 | O'keefe, Jr. | |
| 9,243,830 | B2 | | 1/2016 | Chadwell et al. | |
| 9,296,602 | B2 | * | 3/2016 | Juhasz | B67D 7/78 |
| 9,499,386 | B2 | | 11/2016 | Malinski | |
| 9,670,050 | B1 | | 6/2017 | Casher et al. | |
| 9,815,678 | B2 | | 11/2017 | Furberg et al. | |
| 9,915,457 | B2 | | 3/2018 | Cleland | |
| 9,963,338 | B2 | | 5/2018 | Diffenderfer | |
| 10,501,307 | B2 | | 12/2019 | Henriquez | |
| 11,034,569 | B2 | | 6/2021 | Kaplan et al. | |
| 11,091,360 | B2 | | 8/2021 | Christiansen | |
| 11,655,134 | B1 | * | 5/2023 | Perkins | B67D 1/0003 222/129.1 |
| 11,718,515 | B2 | * | 8/2023 | Yamashita | B67D 1/07 222/400.7 |
| 11,760,619 | B2 | * | 9/2023 | Mills | B67D 1/0888 222/145.6 |
| 2006/0226170 | A1 | * | 10/2006 | Larsen | B67D 1/0004 222/64 |
| 2008/0223410 | A1 | * | 9/2008 | Molloy | B08B 9/0326 134/113 |
| 2010/0089943 | A1 | * | 4/2010 | Till | B67D 3/0006 222/61 |
| 2010/0170916 | A1 | * | 7/2010 | Segers | B67D 1/07 222/1 |
| 2010/0176147 | A1 | * | 7/2010 | Segers | B67D 1/0837 222/1 |
| 2010/0276452 | A1 | * | 11/2010 | Vesborg | B67D 1/0878 222/144.5 |
| 2020/0290862 | A1 | | 9/2020 | Madden | |
| 2021/0087041 | A1 | | 3/2021 | Volftsun et al. | |
| 2021/0114858 | A1 | | 4/2021 | Fitzgerald et al. | |
| 2023/0110597 | A1 | * | 4/2023 | Beavis | F04B 49/065 222/52 |

OTHER PUBLICATIONS

Wineemotion USA, Liquor Dispenser & Wine Preserving Machines, Wine Dispensing Machines, https://wineemotionusa.com. Consulted on Aug. 17, 2022.

* cited by examiner

ENVIRONMENTALLY FRIENDLY METHOD OF SUPPLYING WINE AT A DISPENSING LOCATION, WINE DISPENSING SYSTEM AND CABINET

FIELD

The improvements generally relate to fluid dispensing and more particularly relate to dispensing wines such as red wine or white wine.

BACKGROUND

Wine is generally poured into glasses straight from its bottle. As a typical bottle typically contain between five glasses, a party of people socializing may drink a significant number of bottles in an evening, week-end or vacation week. As state-of-the-art recycling plants are costly to construct, operate and maintain, a non-negligible number of empty bottles end up in trash depositories, with almost no hope of being re-used or recycled. Although existing techniques to re-use or recycle wine bottles are often satisfactory, there thus remains room for improvement.

SUMMARY

It was found that there was a need, especially in gated communities or villages, to dispense wine in a centralized bulk manner without necessarily relying on bottles. More specifically, there is described herein a method of supplying wine at one or more dispensing locations using dedicated wine supply systems and dispensing cabinets. As described herein, the wine supply system is analogous to a conventional aqueduct. However, instead of supplying water, wine is supplied using a system which is protected from external harsh conditions typically encountered in colder or southern climates. As a result of the use of the dedicated wine supply system described herein, it is expected that the use of wine bottles can be greatly reduced, which can be environmentally friendly as it can reduce the amount of wasted bottles, but also circumvent the energy demanding bottling processing steps and also facilitate bulk transportation.

In accordance with a first aspect of the present disclosure, there is provided a method of supplying wine at a dispensing location, the method comprising: filling a tank with wine; while forcing at least some wine along a duct extending between the tank and the dispensing location, maintaining the duct within a given temperature range during said guiding, said maintaining including at least one of heating and cooling the duct; and the duct supplying the at least some wine at the dispensing location.

In accordance with a second aspect of the present disclosure, there is provided a wine supply system comprising: a tank containing wine; a plurality of ducts extending between the tank and a corresponding plurality of dispensing locations, at least some wine being forcingly guided from the tank to the dispensing locations via the plurality of ducts; and a temperature maintaining device disposed along the plurality of ducts, the temperature maintaining device configured for at least one of heating and cooling said ducts to maintain the wine within a given temperature range.

In accordance with a third aspect of the present disclosure, there is provided a wine dispensing cabinet comprising: a frame; a sink assembly having a sink mounted to a lower portion of the frame, a faucet spout above the sink and a faucet actuator actuatably connected to the faucet spout; a wine reservoir mounted to an upper portion of frame, the wine reservoir having a refrigerating system maintaining wine contained within the wine reservoir at a given temperature; and a conduit fluidly connecting the wine reservoir to the faucet spout which upon actuation of the faucet actuator dispenses at least some wine via the faucet spout.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
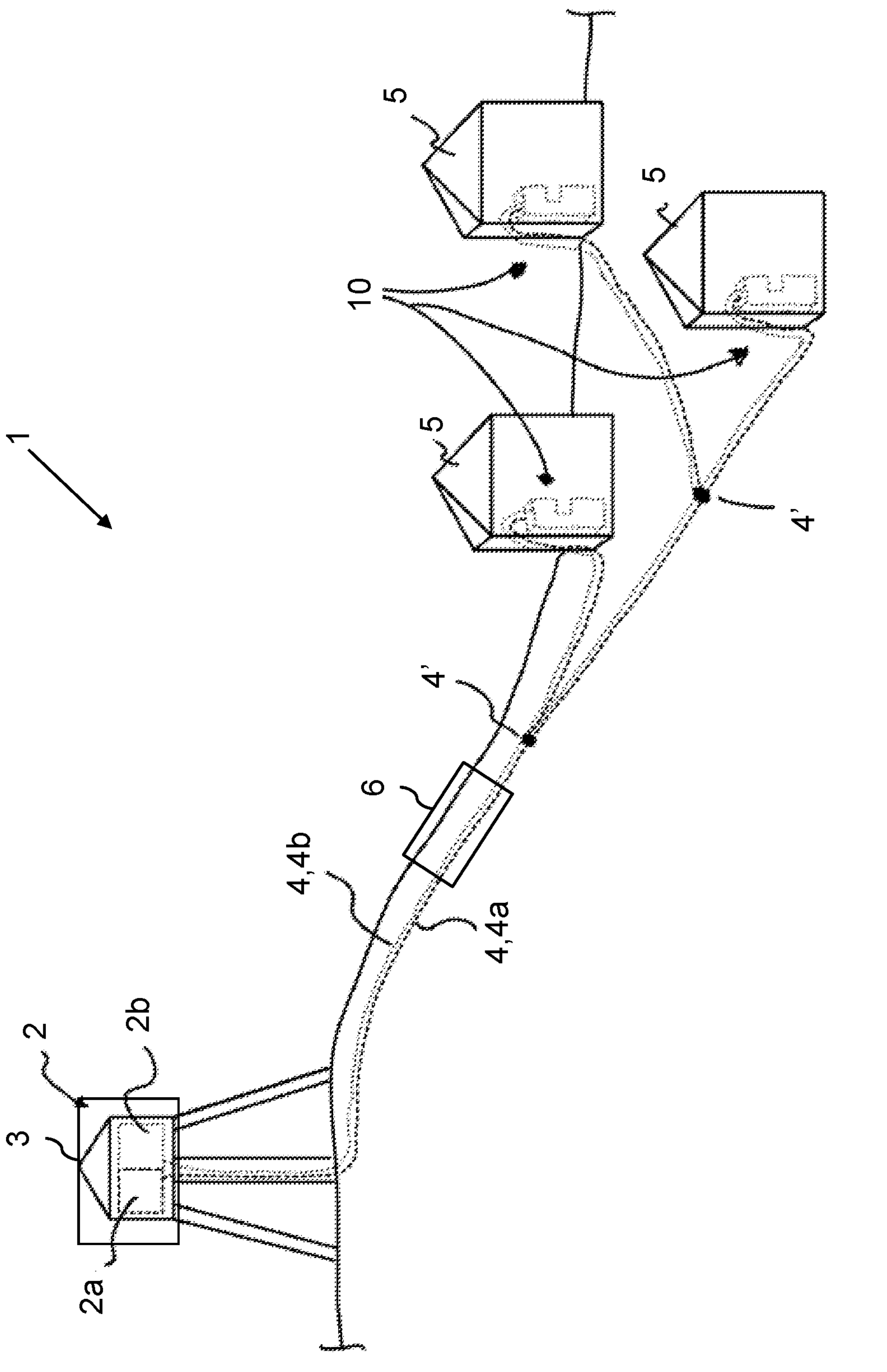
FIG. 1 is a schematic view of an example of a wine supply system.

FIG. 1 shows an example of a wine supply system 1. As depicted, the wine supply system 1 has one or more tanks 2 containing wine(s). Examples of such wine can include, but are not limited to, white wine, red wine, rosé wine, to name a few examples. The tanks 2 may contain different red wines, for instance. In the illustrated example, a first tank **2*a* contains red wine and a second tank 2*b* contains white wine. More than two tanks 2 containing different wines may be provided in some other embodiments. Any one of the tanks 2 may be located in a building referred to as a source building 3. Depending on the embodiment, more than one tank 2 may be in a given source building 3. Tanks 2 may be located in different source buildings 3. The wine supply system 1 has a number of ducts 4 extending between the tank(s) 2 and a corresponding number of dispensing locations, or dispensing buildings 5, where the wines are supplied. For instance, first ducts 4*a* may guide the red wine from the first tank 2*a* to one or more of the dispensing locations 5, and second ducts 4*b* may guide the white wine from the second tank 2*b* to one or more of the dispensing locations 5. As shown, at least some wine is forcingly guided from the first and second tanks 2*a*, 2*b* to the dispensing locations 5 via the ducts 4. Splitter connectors 4' may be used to split a main flow of wine into a number of secondary flows as depicted. As depicted, the wine supply system 1 has one or more temperature maintaining devices 6 disposed along the first and second ducts 4*a*, 4*b*. The temperature maintaining devices 6 are configured for heating and/or cooling the ducts 4 in order to maintain the wine within a given temperature range. For instance, in northern climates, the outside temperature may go below a given threshold temperature, or even below the freezing point, which is detrimental to preserving the quality of the wines that are to be supplied at the dispensing locations. In some other climates, such as southern ones, the outside temperature may go higher than what is generally accepted for wines. Accordingly, the temperature maintaining devices 6 are operated not only to maintain the wines being guided via the ducts 4 above its freezing point but also within given temperature range which is deemed to be ideal for each type of wine. In some embodiments, the given temperature range extends between about 6 and 15 degrees Celsius, preferably between 10 and 14 degrees Celsius and most preferably between 12 and 14 degrees Celsius. The temperature maintaining devices can include a heating device, a cooling device, or a combination of both depending on the surrounding climate. In some embodiments, the heating and the cooling can be performed using geothermal energy stored into the ground and accessible using a geothermal well. In some embodiments, the heating is performed using resistive wires which heat when electricity is applied thereacross. In some embodiments, a plurality of temperature maintaining devices 6 are provided. Depending on the embodiment, at least two of the plurality of temperature maintaining devices 6 may be spaced from one another along a given duct 4 of the plurality of ducts 4. As shown in FIG. 1, wine dispensing cabinets 10 can be provided at each of the dispensing locations, with each wine dispensing cabinet 10 having input ports being in fluid communication with corresponding ducts. The wine dispensing cabinets 10 may be enclosed in respective lodges, buildings, houses, restaurants of a gated community, among contemplated types dispensing buildings 5**, where parties of people may enjoy fresh and temperature controlled wines, without having to rely on physical bottles and deal with their disposal. As such, the waste of a significant number of bottles may be avoided.

In some embodiments, such as the one illustrated in FIG. 1, the tank 2 is elevated relative to the dispensing locations 5, accordingly the guiding of the wine is performed via gravity pulling at least some wine along and into the ducts 4 towards the dispensing locations. In these examples, it was found convenient to enclose the first and second tanks 2*a*, 2*b* within a source building 3 having an elevated enclosure, such as a tower and the like. In some other embodiments, the wine supply system 1 has one or more vacuum pumps (not shown) creating a vacuum within the ducts thereby pulling the wine from the tank 2 along and into the duct 4 towards the dispensing locations 5. The vacuum pumps and ducts 4 (or tubes) used in these embodiments may be similar to the ones used in the maple syrup industry. It is noted that a combination of gravity pulling and vacuum pulling can be used in some embodiments depending on a topography of the terrain where the system is installed. The source building 3 may be adapted so as to be suitable for the topography of the terrain and/or the climate of the location. In some embodiments, the source building 3 may be located at a ground level that is higher than that of the dispensing buildings 5, and be suitable to shelter tank(s) 2 from direct exposure to weather elements.

Figures 2, 3:
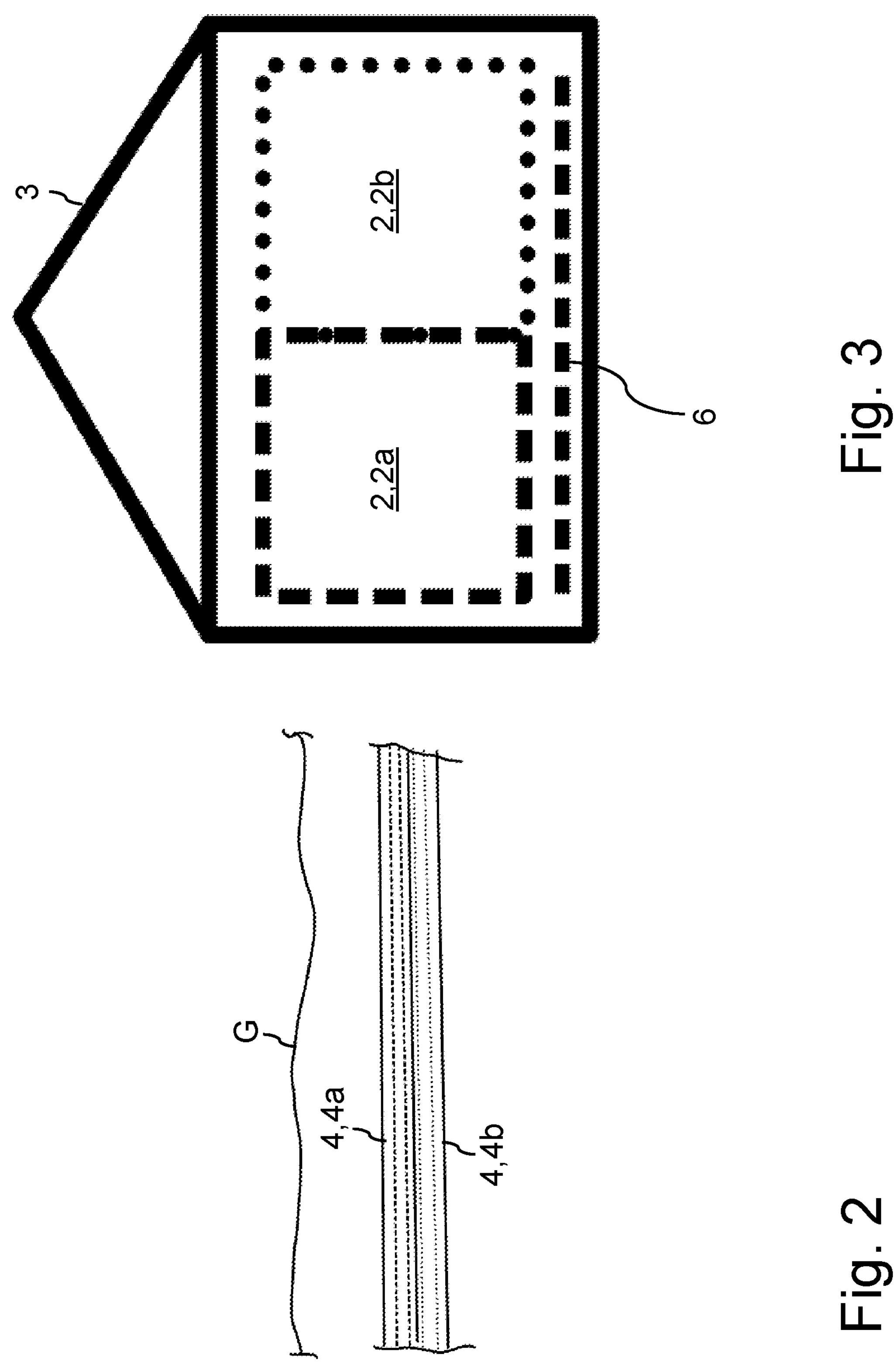
FIG. 2 is a side sectional view of examples ducts of the wine supply system of FIG. 1, showing inset 2 of FIG. 1.
FIG. 3 is a side sectional view of an example of a tank of the wine supply system of FIG. 1, showing inset 3 of FIG. 1.

As best shown in FIG. 2, each duct 4 has at least a portion thereof which runs underground (i.e., under a ground surface G). By partially or wholly burying the ducts 4 underground, temperature control can be facilitated. For instance, the temperature maintaining device 6 can be embodied by a hole running at a given depth underground and protecting the ducts 4 from the external temperature variations. In these embodiments, air present around the ducts 4 and within the hole may serve as thermal insulator. In some embodiments, it was found convenient to expose some of the ducts 4, being underground or above ground, as they may provide an interesting look in a gated community, for instance. In some embodiments, the temperature heating devices 6 can include one or more heating devices provided in the form of one or more resistive wires running along, or coiling around, each one of the ducts. For instance, the first duct 4*a*, the second duct 4*b* and the resistive wire may run alongside one another within a protective jacket. Any other types of heating devices can be used including, but not limited to, furnace-based heating devices, boiler-based heating devices, heat pump, radiant heating, geothermal heater, and the like. Any type of cooling device can be used as well. The ducts 4 may be buried at a depth of 1 meter, preferably 2 meters and most preferably greater than 3 meters to limit the impact of outside temperature variations and freezing. Depending on the embodiment, temperature maintaining device(s) 6 may be provided along underground portion(s) and aboveground portion(s) of a given duct. The tank 2 may also be provided with one or more temperature maintaining devices 6 such as shown in FIG. 3. In some embodiments, each of the first and second tanks 2*a*, 2*b* has its respective temperature maintaining device 6 configured to maintain a respective one of the red wine and white wine at a corresponding temperature prior to its delivery across the duct system. Similarly, each one of the first and second ducts 4*a*, 4*b* may have its own temperature maintaining device 6 configured to maintain the red and white wines are their optimal temperatures. The typical red wine is generally kept between about 11 degrees Celsius and about 18 degrees Celsius, preferably kept between about 13 degrees Celsius and about 16 degrees Celsius and most preferably kept at about 14 degrees Celsius. The typical white wine is generally kept between about 9 degrees Celsius and about 14 degrees Celsius, preferably kept between about 10 degrees Celsius and about 13 degrees Celsius and most preferably kept at about 12 degrees Celsius.

Figure 4A:
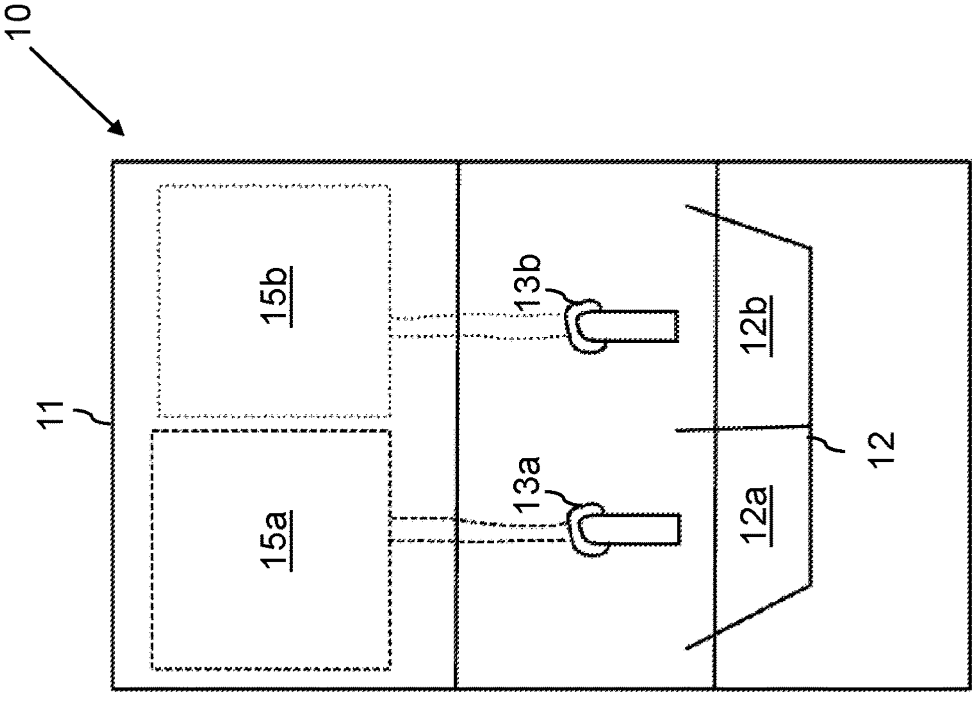
FIG. 4A is a front view of the wine dispensing cabinet of FIG. 4.
Figure 4:
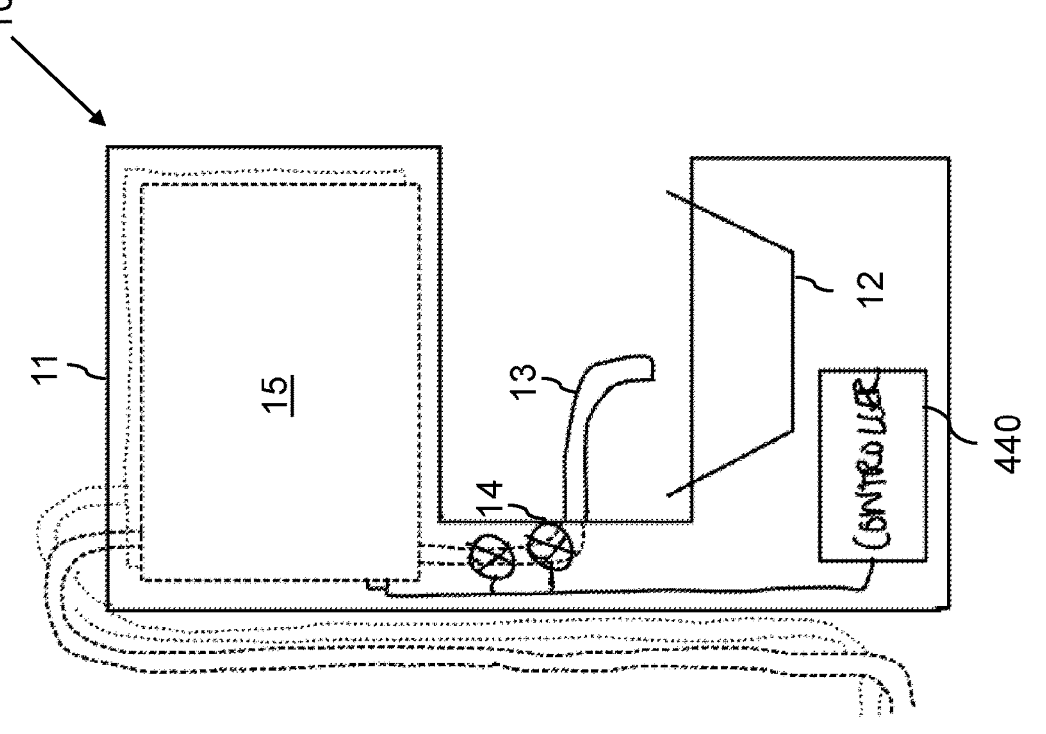
FIG. 4 is a side sectional view of an example of a wine dispensing cabinet of the wine supply system of FIG. 1.

FIGS. 4 and 4A show an example of a wine dispensing cabinet 10. As shown, the wine dispensing cabinet 10 has a frame 11, and a sink assembly 12 having a sink mounted to a lower portion of the frame, a faucet spout 13 above the sink and a faucet actuator 14 actuatably connected to the faucet spout. As shown, a first sink assembly 12*a* may be dedicated to a first wine such as red wine whereas a second sink assembly 12*b* may be dedicated to a second wine such as white wine. A partition may be provided between the two sinks to avoid any mixing of the red and white wines. In an upper portion of the frame, one or more wine reservoirs 15, 15*a*, 15*b* are mounted. The wine reservoirs 15*a*, 15*b* have respective refrigerating systems maintaining the wines at corresponding ideal temperatures. As shown, one or more conduits are fluidly connecting the wine reservoirs 15*a*, 15*b* to corresponding faucet spouts 13*a*, 13*b* which upon actuation of a respective one of the faucet actuators 14 dispenses at least some wine.

As depicted, the wine dispensing cabinet 10 has a controller 440 having a processor and a non-transitory computer memory having instructions stored thereon which when executed perform steps to control the use of the wine dispensing cabinet 10. The refrigerating system of the wine dispensing cabinet 10 may be controlled by the controller 440 to ensure that each of the reservoirs be kept at optimal temperatures. For instance, the wine dispensing cabinet 10 can have flow meters being fluidly connected to the conduits for measuring a quantity of wine being dispensed in each one of the first and second sink assemblies. The flow meters can be in communication with the controller 440 so that the controller 440 can monitor the quantities of wine being dispensed in each one of the sink assemblies. In some embodiments, the wine dispensing cabinet 10 has remotely activatable shut off valves fluidly connected along the conduits, with the shut off valves being remotely activatable to shut off the dispensing in both the first and second sink assemblies. The shut off valves can be in communication with the controller 440 so that the controller 440 can activate or deactivate the shut off valves as desired. The controller 440 may close the shut off valves during a period of unauthorized access whereas the controller 440 may open the shut off valves during a period of authorized access. These periods may differ from one jurisdiction to another. For instance, an exemplary period of authorized access may span from 12 PM to 2 AM the next day and an exemplary period of unauthorized access may span from 2 AM to 12 PM the next day. In some embodiments, the wine dispensing cabinet 10 has a credential input system being communicatively coupled to the controller 440. The controller 440 is configured to determine whether a user is authorized to operate the wine dispensing cabinet 10. In these embodiments, the shut off valves are closed at all times until an authorized user verifies their identify accordingly using the credential input system. For instance, the credential input system can be provided in the form of an electromagnetic card reader, an optical reader (e.g., a QR-code reader), or a keyboard in which a dedicated password or PIN number can be inputted. As such, to open the shut off valves and allow the dispensing of the wine, any authorized user has to validate their credentials using the credential input system. Upon validation, the shut off valve(s) may remain open for a given period of time, or close immediately after the dispensing. In some embodiments, for an authorized user to be allowed to use the wine dispensing cabinet 10, not only do their credentials need to be authenticated but the time at which they authenticate their credentials must be during a period of authorized access. At any time, the controller 440 may receive an external instruction to close the shut off valves and prevent authorized or unauthorized users to use the cabinet 10.

The controller 440 can be provided as a combination of hardware and software components. The hardware components can be implemented in the form of a computing device 500, an example of which is described with reference to FIG. 5.

Figure 5:
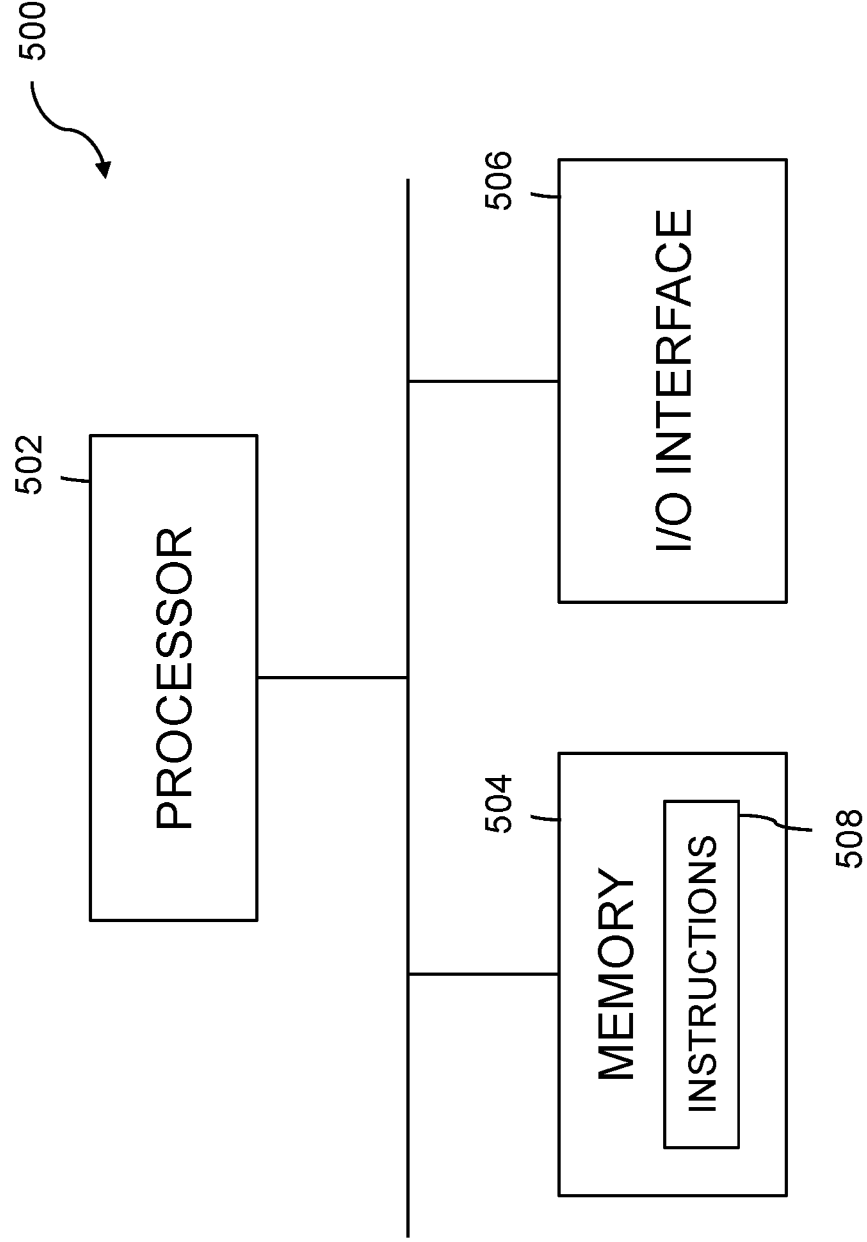
FIG. 5 is a schematic view of a hardware implementation of a controller of the wine dispensing cabinet of FIG. 4.

Referring to FIG. 5, the computing device 500 can have a processor 502, a memory 504, and I/O interface 506. Instructions 508 for operating the wine dispensing cabinet can be stored on the memory 504 and accessible by the processor 502.

The processor 502 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 504 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables the computing device 500 to interconnect with one or more input devices, such as keyboard(s), mouse(s), flow meter(s), and credential input system(s), or with one or more output devices such as monitor(s), shut off valve(s), accessible memory system(s) and/or external network(s).

Each I/O interface 506 enables the controller 440 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In some embodiments, a software application is stored on the memory 504 and accessible by the processor 502 of the computing device 500. The software application can be configured to control the use of the shut off valve(s), the refrigerating system(s) and the flow meter(s), for instance.

The computing device 500 and the software application described above are meant to be examples only. Other suitable embodiments of the controller 440 can also be provided, as it will be apparent to the skilled reader.

Figure 6:
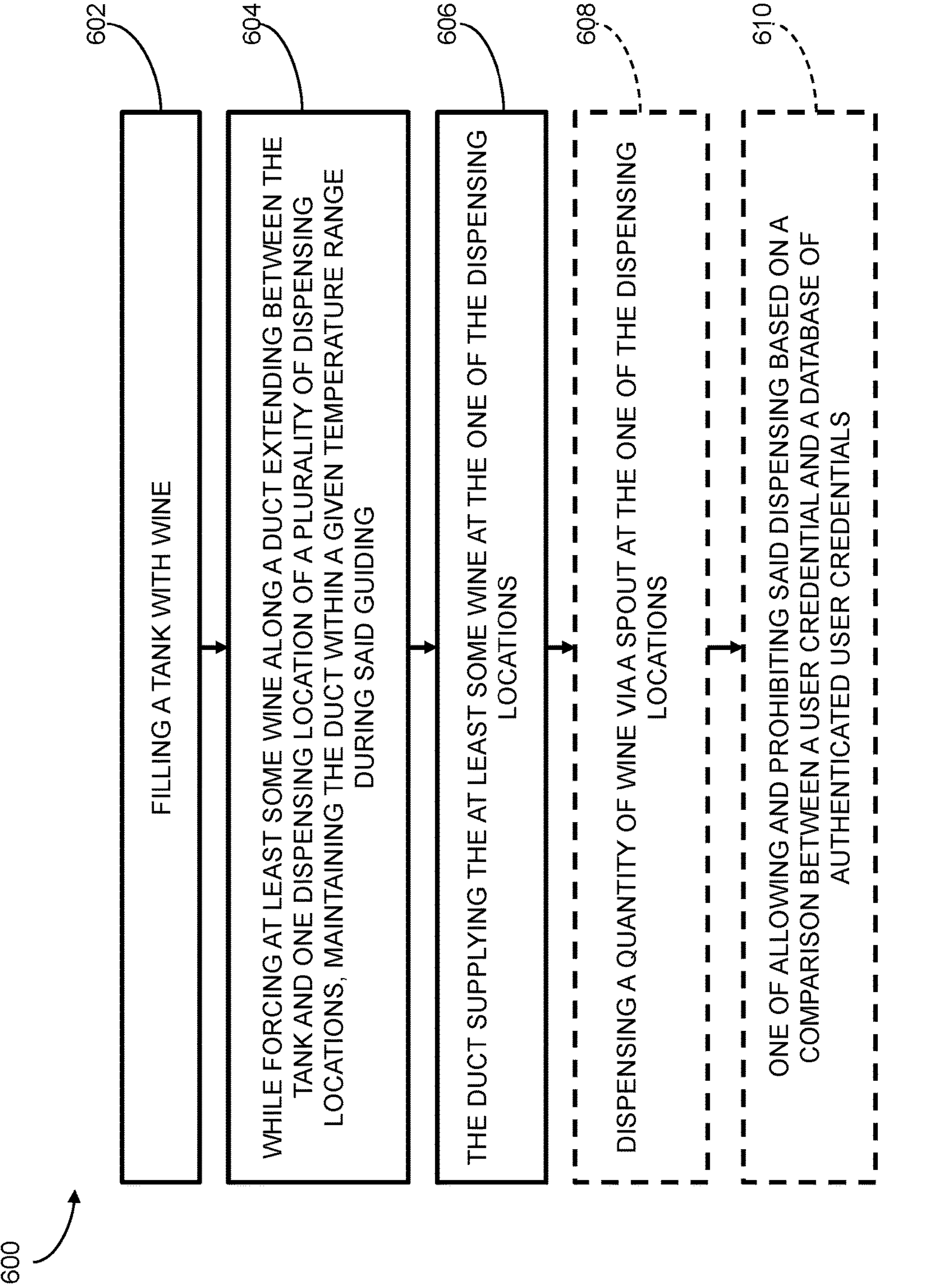
FIG. 6 is a flow chart of an example of a method of supplying wine at a dispensing location.

FIG. 6 shows an example of a method 600 of supplying wine at one dispensing location of a few or many dispensing locations. The method 600 can be performed using the wine dispensing system 1 and cabinet 10 described above. Although the method 600 is described with reference to one of the dispensing locations, it is understood that it can be performed simultaneously or sequentially relative to each one of the dispensing locations.

At step 602, a tank is filled with wine. Depending on the embodiment, the wine can be provided in the form of red wine, white wine and the like. In some embodiments, more than one tank is filled with different wines. For instance, a first tank may be filled with red wine whereas a second tank may be filled with white wine.

At step 604, while forcing at least some wine along a duct extending between the tank and one of the dispensing locations, the duct is heated to a temperature exceeding a freezing point of the wine during said guiding. In some embodiments, the step 604 of heating maintain the wine above 6 degrees Celsius, preferably above 10 degrees Celsius, and most preferably at about 13 degrees Celsius. As discussed above, the wine supply can rely on gravity, such as in Roman ducts, or on a vacuum pump system. In the former embodiments, the tank is preferably elevated relative to the dispensing location so that the gravity pull at least some wine along and into the duct towards the dispensing location. In the former embodiments, the method can have a step of vacuum pumping at least some wine from the tank along and into the duct.

At step 606, the duct supplies the at least some wine at the one of the dispensing locations. In some embodiments, as per step 608, the method has a step of dispensing a quantity of wine via a spout at the dispensing location. To dispense the wine, a shut off valve may be selectively open for a given amount of time and then closed. For instance, in some embodiments, one may open and close the shut off valve by actuating an actuator or lever of the shut off valve. For instance, in a typical situation, a user may bring a glass under the spout, open the shut off valve for a given period of time, and close the valve once the glass is satisfactory filled with the corresponding wine.

In embodiments where the dispensing cabinet 10 has a flow meter, the step of dispensing can include a step of measuring a value for the quantity of wine and generating a signal indicative of the measured value. As such, the wine being dispensed at some of the dispensing cabinets 10 can be monitored and invoiced accordingly. The generated signal can be associated to a given user credential to keep track of what user has used how much wine, for instance.

In some embodiments, the dispensing is either allowed or prohibited based on a comparison between a time at which the valve is operated and a period of authorized dispensing. For instance, if the period of authorized dispensing spans from 12 PM to 2 AM the next day, any dispensing from 2 AM to 12 PM the next day would be prohibited, even upon actuation of the valve. This can be performed by another valve being unexposed to external users, for instance. The period of authorized dispensing may differ from one embodiment to another or from one dispensing location to another. The period of authorized dispensing may depend on a local permit, for instance. In some embodiments, the method includes a step of validating a user credential for the dispensing. In these embodiments, the dispensing is either allowed or prohibited based on a comparison between the user credential and a database of authenticated user credentials. The user credential can be communicated to the controller 440 of the dispensing cabinet 10 using an input system such as an electromagnetic card reader, an optical reader (e.g., a QR-code reader), a dedicated password or PIN number, and the like.

As can be understood, the examples described above and illustrated are intended to be exemplary only. For instance, the wine supply system 1 can be use to supply wine to dispensing buildings within gated communities, lodge communities, hotels, apartment or condo buildings, resorts, villages and/or cities depending on the embodiment. The reservoirs, ducts and each components in fluid contact with the wine can be food grade. In some embodiments, the wine dispensing cabinets 10 are not in fluid communication with the ducts of the wine dispensing system 1. For instance, the reservoirs disposed in the upper portion of the frame of the wine dispensing cabinet 10 are filled manually on a regular or on-demand basis. In some embodiments, the methods, system and cabinet described herein are used to any type of adult beverage including wines, beer, cider and the like. The scope is indicated by the appended claims.

What is claimed is:

1. A wine supply system comprising:

a tank provided in a source building, the tank containing wine;

a plurality of ducts extending between the tank and a corresponding plurality of dispensing buildings remote from the source building and from one another, at least some wine being forcingly guided from the tank to the dispensing buildings via the plurality of ducts; and a temperature maintaining device disposed along the plurality of ducts outside of the source building and the plurality of dispensing buildings, the temperature maintaining device configured for at least one of heating and cooling said ducts to maintain the wine within a given temperature range.

2. The wine supply system of claim 1 wherein the tank is elevated relative to the dispensing buildings, the at least some wine being forcingly guided from the tank to the dispensing buildings by gravity pulling the at least some wine along and into the plurality of ducts.

3. The wine supply system of claim 1 further including a vacuum pump creating a vacuum within the plurality of ducts pulling the at least some wine from the tank along and into the plurality of ducts towards the plurality of dispensing buildings.

4. The wine supply system of claim 1 wherein at least a portion of at least one of the plurality of ducts runs underground.

5. The wine supply system of claim 1, wherein the temperature maintaining device is one of a plurality of temperature maintaining devices of the wine supply system, at least two of the plurality of temperature maintaining devices being spaced from one another along a duct of the plurality of ducts.

6. A method of supplying wine from a source location to a plurality of dispensing locations remote from one another and remote from the source location, the method comprising:

filling a tank with wine at the source location;

while forcing at least some wine along a duct extending between the tank and one dispensing location of the plurality of dispensing locations, maintaining the duct within a given temperature range during said forcing, said maintaining including at least one of heating and cooling the duct; and the duct supplying the at least some wine at the one dispensing location, wherein the tank is elevated relative to the one dispensing location, said forcing including gravity pulling the at least some wine along and into the duct.

7. The method of claim 6 wherein said forcing includes vacuum pumping the at least some wine from the tank along and into the duct.

8. The method of claim 6 wherein said given temperature range includes 13 degrees Celsius.

9. The method of claim 6 wherein at least a portion of the duct runs underground.

10. The method of claim 6 further comprising dispensing a quantity of wine via a spout at the one dispensing location.

11. The method of claim 10 further comprising one of allowing and prohibiting said dispensing based on a comparison between a time of said dispensing and a period of authorized dispensing.

12. The method of claim 10 further comprising one of allowing and prohibiting said dispensing based on a comparison between a user credential and a database of authenticated user credentials.

13. The method of claim 10 wherein said dispensing includes measuring a value for the quantity of wine and generating a signal indicative of the value.

14. The method of claim 13 wherein said signal is associated to a user credential.

15. The method of claim 10 further comprising refrigerating a given quantity of wine at the one dispensing location prior to said dispensing.

16. The method of claim 15 wherein said refrigerating maintains said wine below 15 degrees Celsius.

17. A method of supplying wine from a source location to a plurality of dispensing locations remote from one another and remote from the source location, the method comprising:

filling a tank with wine at the source location;

while forcing at least some wine along a duct extending between the tank and one dispensing location of the plurality of dispensing locations, maintaining the duct within a given temperature range during said forcing, said maintaining including at least one of heating and cooling the duct; and the duct supplying the at least some wine at the one dispensing location;

one of allowing and prohibiting said dispensing based on at least one of: a comparison between a time of said dispensing and a period of authorized dispensing, and a comparison between a user credential and a database of authenticated user credentials.

* * * * *